United States Patent
Miyajima et al.

(10) Patent No.: US 7,756,113 B2
(45) Date of Patent: *Jul. 13, 2010

(54) IP TERMINAL APPARATUS

(75) Inventors: Akira Miyajima, Yokohama (JP); Kazuto Kobayashi, Kawasaki (JP)

(73) Assignee: Panasonic Corporation, Osaka (JP)

( * ) Notice: Subject to any disclaimer, the term of this patent is extended or adjusted under 35 U.S.C. 154(b) by 1324 days.

This patent is subject to a terminal disclaimer.

(21) Appl. No.: 11/235,217

(22) Filed: Sep. 27, 2005

(65) Prior Publication Data

US 2006/0072575 A1 Apr. 6, 2006

(30) Foreign Application Priority Data

Oct. 5, 2004 (JP) .............................. 2004-292865

(51) Int. Cl.
*H04L 12/56* (2006.01)

(52) U.S. Cl. ....................... 370/352; 370/260; 370/356; 370/395.52; 379/900; 707/999.003; 709/203; 709/219

(58) Field of Classification Search ................. 370/356, 370/392, 260, 352, 395.52; 379/355.01, 379/900; 709/245, 203, 219; 707/999.003
See application file for complete search history.

(56) References Cited

U.S. PATENT DOCUMENTS

| | | | |
|---|---|---|---|
| 6,498,797 B1 | 12/2002 | Anerousis et al. | |
| 7,320,026 B2 * | 1/2008 | Adamczyk | 709/219 |
| 7,453,827 B2 * | 11/2008 | Toyoda | 370/260 |
| 7,551,605 B2 * | 6/2009 | Miyajima et al. | 370/352 |
| 7,564,836 B2 * | 7/2009 | Miyajima | 370/352 |
| 7,602,767 B2 * | 10/2009 | Miyajima et al. | 370/352 |
| 7,620,036 B2 * | 11/2009 | Kobayashi et al. | 370/352 |
| 7,653,049 B2 * | 1/2010 | Kobayashi et al. | 370/352 |
| 2003/0214940 A1 | 11/2003 | Takken | |
| 2004/0003114 A1 * | 1/2004 | Adamczyk | 709/245 |
| 2005/0182781 A1 * | 8/2005 | Bouvet | 707/102 |
| 2006/0029044 A1 * | 2/2006 | Kobayashi et al. | 370/352 |
| 2006/0029045 A1 * | 2/2006 | Kobayashi et al. | 370/352 |
| 2006/0029219 A1 * | 2/2006 | Kobayashi et al. | 379/900 |

(Continued)

FOREIGN PATENT DOCUMENTS

EP 1061728 12/1999

(Continued)

OTHER PUBLICATIONS

Mealling, "Dynamic Delegation Discovery System (DDDS) Part Three: The Domain Name System (DNS) Database," IETF RFC 3403, Oct. 2002, XP15009158.

(Continued)

*Primary Examiner*—Gerald Gauthier
(74) *Attorney, Agent, or Firm*—Greenblum & Bernstein, P.L.C.

(57) ABSTRACT

A CPU executes a process for obtaining, from an ENUM server, a NAPTR record of a destination IP terminal by controlling an IP network controller when placing a call to the destination IP terminal, a process for determining whether the destination IP terminal has at least one communication function corresponding to the source IP terminal based upon the communication functions specified in the NAPTR record and a process for displaying, on a display, the at least one communication function that is determined to be stored in the destination IP terminal.

3 Claims, 5 Drawing Sheets

U.S. PATENT DOCUMENTS

| | | | | |
|---|---|---|---|---|
| 2006/0067305 | A1* | 3/2006 | Kobayashi et al. | 370/352 |
| 2006/0092922 | A1* | 5/2006 | Kobayashi et al. | 370/352 |
| 2007/0189500 | A1* | 8/2007 | Stanford | 379/355.01 |
| 2010/0014512 | A1* | 1/2010 | Kobayashi et al. | 370/352 |

FOREIGN PATENT DOCUMENTS

| | | |
|---|---|---|
| JP | 6-169387 | 6/1994 |
| JP | 8-130594 | 5/1996 |
| JP | 8-195870 | 7/1996 |
| JP | 2004-248086 | 9/2004 |
| KR | 10-1999-0003258 | 1/1999 |
| KR | 10-2004-0028333 | 4/2004 |

OTHER PUBLICATIONS

Faltstrom et al., "The E.164 to Uniform Resource Identifiers (URI) Dynamic Delegation Discovery System (DDDS) Application (ENUM)," IETF RFC 3761, Apr. 2004, XP15009541.

English Language Abstract of KR 10-2004-0028333.

English Language Abstract of KR 10-2000-0054908.

Fujiwara, Solution Technology for IP Telephone: "EMUM", Nikkei Communications, No. 422, Nikkei Business Publications, Inc., Sep. 15, 2004, pp. 126-134 along with an English language translation of a portion of p. 133.

ENUM Trial Japan, "ENUM Trial Japan First Report," May 2004, together with an English language translation of the same.

U.S. Appl. No. 11/150,119 to Kobayashi et al., filed Jun. 13, 2005.

U.S. Appl. No. 11/235,275 to Miyajima, filed Sep. 27, 2005.

U.S. Appl. No. 11/235,156 to Miyajima et al., filed Sep. 27, 2005.

U.S. Appl. No. 11/235,273 to Miyajima et al., filed Sep. 27, 2005.

U.S. Appl. No. 11/235,154 to Miyajima, filed Sep. 27, 2005.

U.S. Appl. No. 11/249,715 to Kobayashi et al., filed Oct. 14, 2005.

Conroy et al. JPRSL, "ENUM Implementation Issues and Experiences," IETF Standard-Working-Draft, Internet Engineering Task Force, IETF, CH, vol. enum, (Jul. 2004), XP015018179.

Stastny, "Scenarios for ENUM and ENUM-like Systems <draft-stantny-enum-scenarios-00.txt>," IETF Standard-working-draft, Internet Engineering Task Force, IETF, CH, pp. 1-18, (Jun. 2002), XP015005364.

"Report of the Department of State ITAC-T Advisory Committee Study Group A Ad Hoc on ENUM," chaired by G. Richenaker, ENUM, pp. 1-39, (Jun. 6, 2001), XP002238095.

Kaspch Carriercom AG: "ENUM Trial," online (Dec. 28, 2003), XP002363054, Retrieved from the Internet <URL. http://web.archive.org/web/20031228201931/http://www.kapsch.net/CarrierCom/de/4627_DEU_HTMLExtranetCD.html > on Jan. 10, 2005, in English and German.

Faltstrom, "E. 164 number and DNS," IETF Standard, Internet Engineering Task Force, IETF, CH, (Sep. 2000), XP015008699.

\* cited by examiner

Fig.3

ENUM Database

| ENUM domain name | | Order | Preference | Flags | Service | URI Scheme |
|---|---|---|---|---|---|---|
| 8.7.6.5.4.3.2.1.5.1.8.e164.arpa | IN NAPTR | 100 | 10 | "u" | "E2U+sip" | "!^.*$!sip:info@sip.dddd.com!" "Taro telephone" |
| | IN NAPTR | 104 | 10 | "u" | "E2U+message:mailto" | "!^.*$!mailto:mail@jp.dddd.com!" "E-mail" |
| | IN NAPTR | 108 | 10 | "u" | "E2U+ifax" | "!^.*$!mailto:ifax@jp.dddd.com!" "FAX" |

NAPTR resource record

IP TERMINAL APPARATUS

BACKGROUND OF THE INVENTION

1. Field of the Invention

The present invention relates to an IP terminal apparatus, particularly to an IP terminal apparatus that utilizes an ENUM server.

2. Description of Related Art

The recent rapid growth of the Internet has drawn attention to an IP telephone system that enables low-cost voice communications with a telephone apparatus at a remote place as well as free voice communications between IP telephone apparatuses owned by subscribers. Furthermore, there are protocols that associate Internet services or resources on the Internet with telephone numbers, such as "ENUM" (tElephone NUmber Mapping) protocol that is defined by RFC 2916 (Publication 1) and has been studied by IETF (Internet Engineering Task Force) and ITU-T (International Telecommunication Union—Telecommunication Standardization Sector).

"ENUM" protocol is designed to allow retrieval of an IP address or a URI (Uniform Resource Identifier) based upon a telephone number that is converted into the E.164 system defined by ITU-T, utilizing DNS (Domain Name System).

An IP terminal apparatus that performs under ENUM protocol is equipped with not only an IP telephone function but also with a plurality of functions such as facsimile and e-mail functions. In addition, a multifunction apparatus having functions such as printer and scanner functions has been provided.

[Publication 1] Issued by ENUM Trial Japan "ENUM Trial Japan First Report" May, 2004

However, an IP terminal apparatus called a multifunction apparatus has the following problems when communication is performed between multifunction apparatuses.

When communication is performed between multifunction apparatuses, although it is possible to perform voice communication by selecting from among IP telephone, facsimile and e-mail functions, both IP terminal apparatuses do not necessarily have all of the communication functions installed. Therefore, when a multifunction apparatus user on the transmitting end selects a communication function that is not stored in a multifunction apparatus on the receiving end, communication failure occurs. This requires the user extra work before identifying communication functions that are selectable for the multifunction apparatus on the receiving end.

SUMMARY OF THE INVENTION

The present invention is provided to address the above-described problems. The purpose of the present invention is to provide an IP terminal apparatus that displays, on a source IP terminal apparatus, selectable communication functions by checking communication functions stored in source and destination IP terminal apparatuses respectively, based upon the NAPTR records of those IP terminal apparatuses stored on an ENUM server.

The present invention relates to an IP terminal apparatus connected to the ENUM server via an IP network. The IP terminal apparatus includes a memory, an obtainer, an identifier, a display and a communication controller. The memory stores a plurality of communication control programs corresponding to various communication functions. The obtainer obtains, from the ENUM server, terminal information regarding the destination IP terminal apparatus, when placing a call. The identifier determines whether the destination IP terminal apparatus stores a communication function corresponding to the IP terminal, based upon the terminal information obtained by the obtainer. The display displays one or a plurality of communication function that are determined to be stored in the destination IP terminal. The communication controller controls voice communication with the destination IP terminal apparatus, when an operation is performed in accordance with the communication function displayed on the display, based upon the communication control program corresponding to the communication function.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 illustrates an example of a NAPTR record that is stored in a database of an ENUM server according to the embodiment;

DETAILED DESCRIPTION OF PREFERRED EMBODIMENTS

The embodiments of the present invention are explained in the following, in reference to the above-described drawings.

Figure 1:
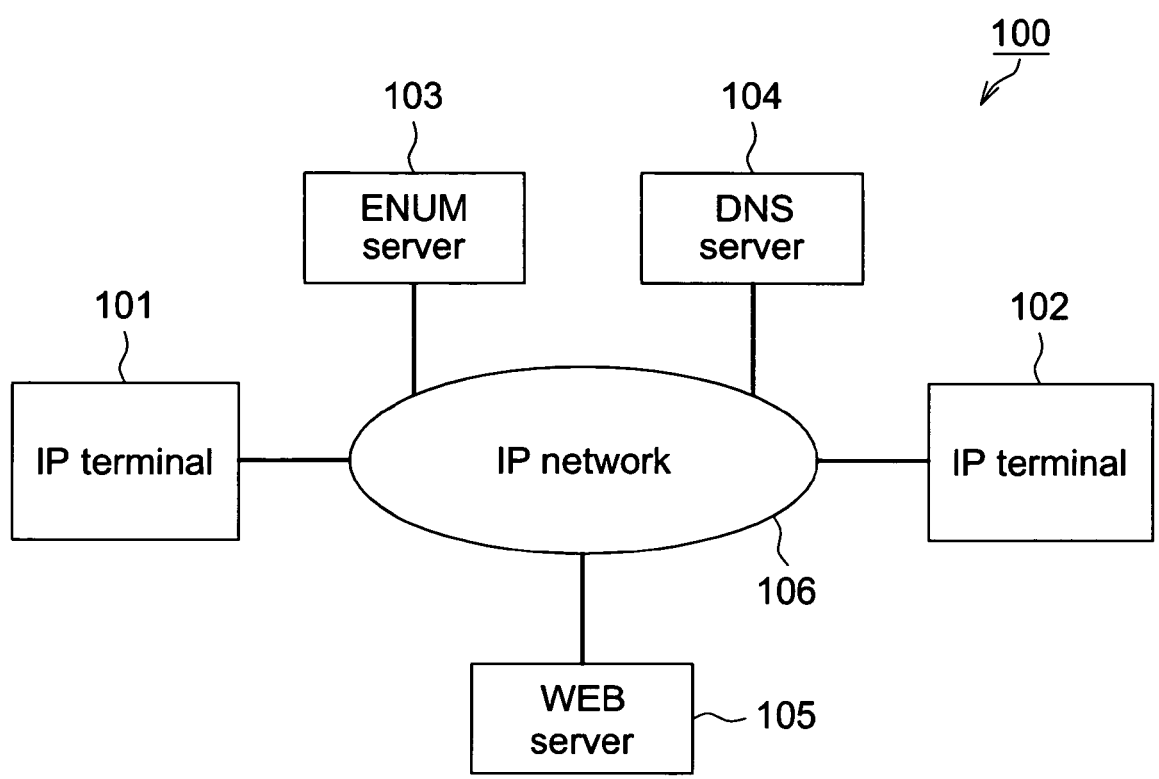
FIG. 1 is a block diagram illustrating a configuration of an IP communication system according to an embodiment of the present invention.

FIG. 1 illustrates an entire configuration of an IP telephone system according to an embodiment of the present invention. In IP communication system 100 of FIG. 1, IP terminal apparatuses (hereafter referred to as IP terminal) 101, 102, ENUM server 103, DNS server 104 and Web server 105 are mutually connected via IP network 106.

IP terminal 101 (102) is a multifunction apparatus equipped with a plurality of communication functions, such as IP telephone, facsimile, and e-mail functions, as well as printer and scanner functions. IP terminal 101 (102) performs voice communication with another IP telephone via IP network 106, using the IP telephone function. IP terminal 101 (102) performs facsimile and e-mail communications with another multifunction apparatus via IP network 106, using the facsimile and e-mail functions.

ENUM (tElephone NUmber Mapping) server 103 is equipped with a database that stores a NAPTR (The Naming Authority Pointer) resource record (hereafter referred to as NAPTR record). ENUM server 103 sends, to IP terminal 101 (102), a NAPTR record stored in the database in response to a query from IP terminal 101 (102).

DNS (Domain Name System) server 104 is equipped with a database that stores URIs (Uniform Resource Identifier) specified in a NAPTR record and IP addresses corresponding to the URIs. DNS server 104 sends, to IP terminal 101 (102), an IP address stored in the database in response to a query from IP phone 101 (102).

Web server 105 reserves information such as HTML (Hyper Text Markup Language) texts and image and transmits, to IP terminal 101 (102), such information via IP network 106 in response to a request from a client software such as a WEB browser.

Figure 2:
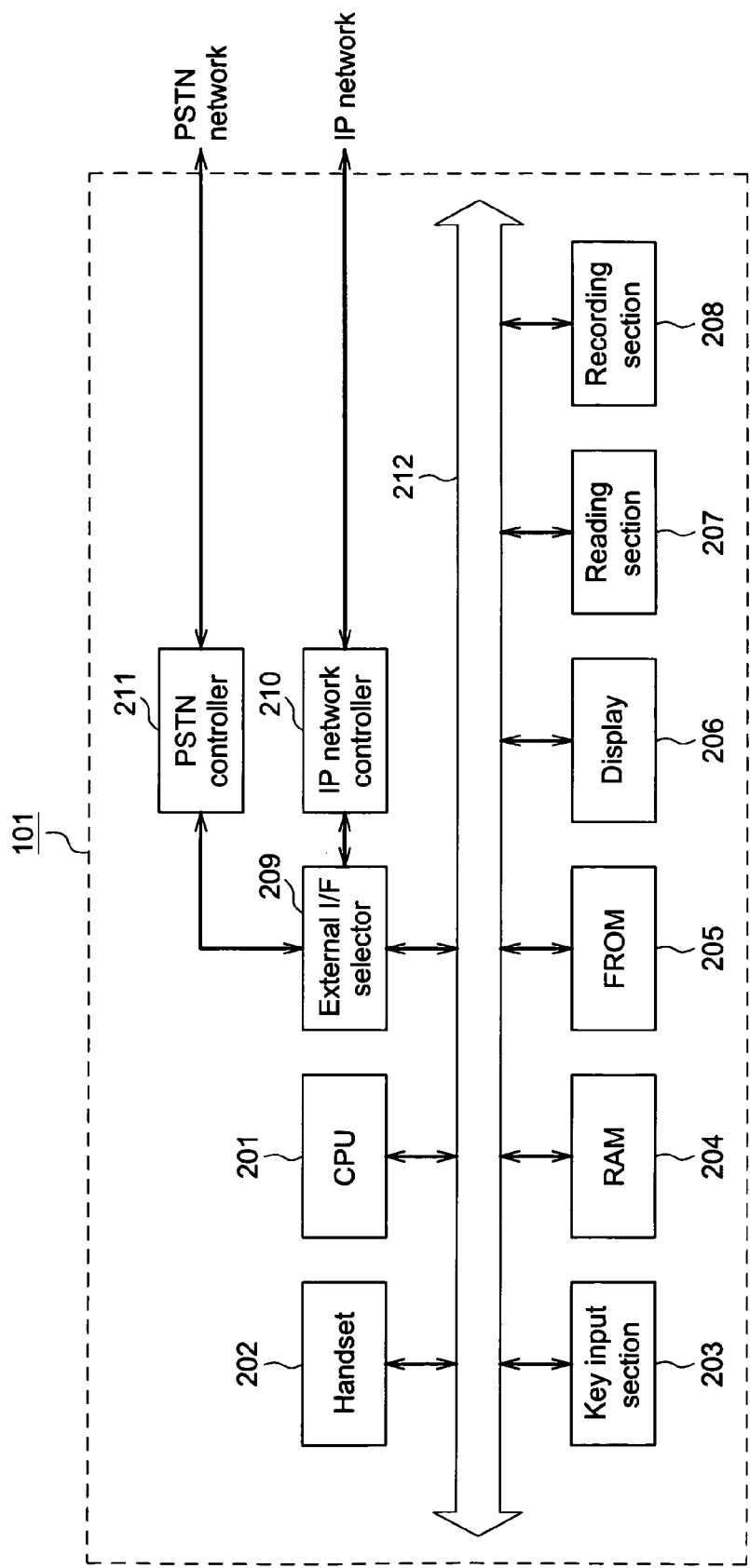
FIG. 2 is a block diagram illustrating a configuration of an IP terminal according to the embodiment.

FIG. 2 is a block diagram illustrating a configuration of IP terminal 101 according to the present embodiment. In FIG. 2, IP terminal 101 includes CPU 201, handset 202, key input section 203, RAM 204, FROM 205, display 206, reading section 207, recording section 208 and external I/F selector 209 that is connected to IP network controller 210 and PSTN controller 211. All devices are mutually connected via bus 212. IP terminal 102 has the same configuration as IP terminal 101.

CPU (Central Processing Unit) 201 controls all operations needed to perform IP telephone, facsimile and e-mail communications with another IP terminal via IP network 106, based upon the IP telephone control program, facsimile communication control program and e-mail control program that are stored in FROM 205. Therefore, CPU 201 performs a call control with the destination IP terminal in accordance with call control protocols such as SIP (Session Initiation Protocol) and H.323. CPU 201 further provides necessary instructions to display 206, external I/F selector 209, IP network controller 210 and PSTN controller 211.

In addition, CPU 201 executes a process for obtaining, from ENUM server 103, a NAPTR record of the destination IP terminal 102 by controlling IP network controller 210 when placing a call to the destination IP terminal 102, a process for determining, based upon the communication functions of the destination IP terminal specified in that NAPTR record, whether the destination IP terminal 102 stores a communication function corresponding to the source IP terminal 101 and a process for displaying, on display 206, one or a plurality of communication functions that are determined to be stored in the destination IP terminal 102.

CPU 201 stores, in RAM 204, flag information associated with the obtained NAPTR record (availability information), the flag information indicating the individual availability of one or a plurality of communication functions that are determined to be stored in the destination terminal. In addition, CPU 201 functions as an obtainer, an identifier and a communication controller.

Handset 202 is used to output, to CPU 201, on/off signals in accordance with the user's on/off hook operations. Handset 202 is equipped with a microphone and a speaker, and is used to convert the user's transmitting voice, via the microphone, into a transmitting voice signal and output the same to CPU 201 when starting voice communication with the destination IP terminal. At the same time, handset 202 outputs, from the speaker, a receiving voice signal input from CPU 201 as receiving voice.

Key input section 203 is equipped with a numeric keypad, various function keys and the like. Key input section 203 is used by the user for dialing to the destination IP terminal and for selecting a communication function, etc.

RAM (Random Access Memory) 204 is used as a work memory when CPU 201 performs a program. RAM 204 stores flag information (availability information) that indicates the individual availability of one or a plurality of communication functions for the destination IP terminal, the communication functions being obtained by CPU 201 performing the above-noted obtaining process.

FROM (Flash Read Only Memory) 205 stores control programs such as IP telephone control program, facsimile control program and e-mail control program. In addition, RAM 204 and FROM 205 function as a memory.

Display 206 configured with an LCD (Liquid Crystal Display) and the like displays the current status of IP terminal 101, telephone numbers input from CPU 201, selectable communication functions for the destination IP terminal and other information. Display 206 functions as a display.

Reading section 207 reads the image of a document placed on a document reader (not shown in the figure) and converts the readout image into digital image data to be sent to CPU 201. Recording section 208 converts the digital image data input from CPU 201 into a recordable form and records the same on a recording sheet.

External I/F selector 209 selects IP network controller 210 or PSTN controller 211 in accordance with an instruction for selecting a communication function, the instruction being input from CPU 201 based upon a communication function that is selected by a user (IP telephone, facsimile, e-mail). Further, external I/F selector 209 outputs, to IP network controller 210 or to PSTN controller 211, transmitting data input from CPU 201 and outputs, to CPU 201, a receiving signal input from IP network controller 210 or PSTN controller 211.

IP network controller 210 has an interface function with IP network 106 to which IP terminal 101 is connected, an IP telephone control function that controls, by CPU 201, an IP phone call with another IP terminal via IP network 106, a facsimile control function that controls, by CPU 201, facsimile communication with another IP terminal via IP network 106 and a function that accesses, under the control of CPU 201, Web server 105 via IP network 106.

When performing facsimile communication, IP network controller 210 transmits, to another IP terminal via IP network 106, digital image data input from CPU 201, receives from another IP terminal digital image data via IP network 106, and transmits the same to CPU 201.

IP network controller 210 performs, under the control of CPU 201, the above-noted process for obtaining, from ENUM server 103, the NAPTR record of the destination IP terminal, when placing a call based upon dialing input from key input section 203.

PSTN (Public Switched Telephone Networks) controller 211 has an interface function with the PSTN (not shown in the figure) to which IP terminal 101 is connected and a communication control function that controls communication with another PSTN communication terminal under the control of CPU 201.

Figure 4:
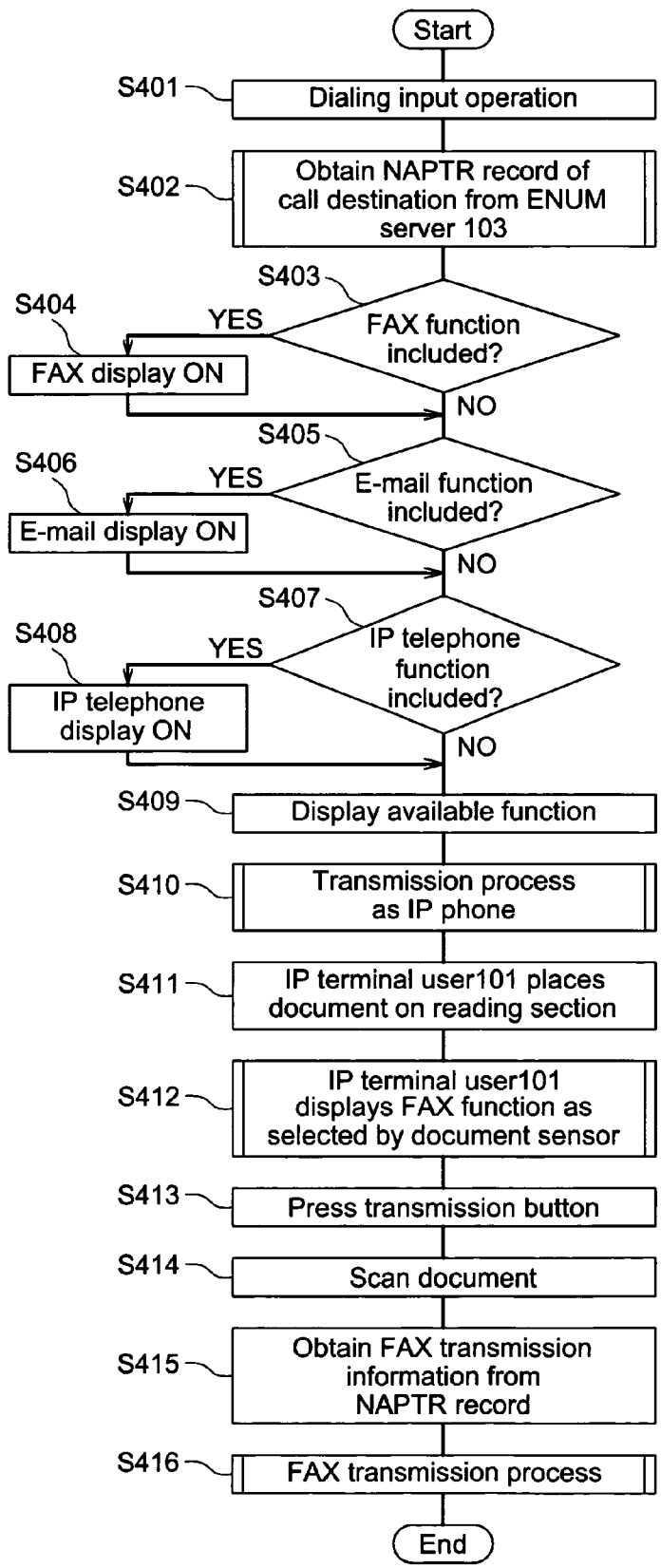
FIG. 4 is a flowchart illustrating an operation of the IP terminal according to the embodiment.

The following illustrates, with the FIG. 4 flowchart, the operations starting from the point where IP terminal 101 starts an IP phone call with IP terminal 102 to the point where IP 101 performs facsimile communication with IP terminal 102.

It is assumed here, in illustrating the FIG. 4 operations, that the database of ENUM server 103 stores the NAPTR record of IP terminal 102 shown in FIG. 3.

In FIG. 3, URIs ""!^.*$!sip:info@sip.dddd.com" "Taro telephone"", ""!^.*$!mailto:mail@jp.dddd.com" "e-mail"", ""!^.*$!mailto:ifax@jp.dddd.com" "FAX"" correspond to domain name "8.7.6.5.4.3.2.1.5.1.8.e164.arpa" obtained from "05012345678", the telephone number of IP terminal 102.

The service field of the first URI specifies "E2U+sip", which indicates that the terminal specified by "05012345678" is able to perform under the SIP protocol. The service field of the second URI specifies "E2U+message: mailto", which indicates that the terminal specified by "05012345678" is capable of e-mail communications. The service field of the third URI specifies "E2U+ifax", which indicates that the terminal specified by "05012345678" is capable of facsimile communications.

Therefore, IP terminal 102 according to the present embodiment has IP telephone, e-mail and facsimile communication functions via IP network 106 to select from.

In FIG. 4, when the IP terminal 101 user dials, from key input section 203, to input the telephone number of IP terminal 102 (step S401), CPU 201 performs a process for obtaining, from ENUM server 103, the NAPTR record of IP terminal 102 (step S402).

In the obtaining process, CPU 201 selects IP network controller 210 by outputting a signal, to external I/F selector 209, for instructing to select an IP communication function. Next, CPU 201 transmits, from IP network controller 210 via external I/F selector 209 to ENUM server 103, a "NAPTR query" message that specifies the telephone number of IP terminal 102.

Upon receiving the "NAPTR query" message from IP terminal 101, ENUM server 103 retrieves, from the database, a corresponding NAPTR record by referring to the telephone number that is specified in the "NAPTR query" message. In this case, the corresponding NAPTR record is shown in FIG. 3. ENUM server 103 transmits, to IP terminal 101, a "NAPTR response" message that specifies the retrieved NAPTR record.

IP terminal 101 receives, from IP network controller 210, the "NAPTR response" message transmitted from ENUM server 103. IP network controller 210 forwards the "NAPTR response" to CPU 201 via external I/F selector 209. Upon receiving the "NAPTR response" message from IP network controller 210, CPU 201 obtains the NAPTR record specified in the "NAPTR response" message and stores the same in RAM 204.

CPU 201 then performs steps S403-S408 shown in FIG. 4 where CPU 201 extracts the communication functions available to IP terminal 102 by comparing the communication functions of IP terminal 102 to those of the source IP terminal 101, based upon the URI schemes specified in the NAPTR record shown in FIG. 3.

CPU 201 determines whether IP terminal 102 has a facsimile function corresponding to IP terminal 101 based upon the URI schemes of the obtained NAPTR record (step S403). In this case, the URI schemes of the NAPTR record shown in FIG. 3 include ""!^.*$!mailto:ifax@jp.dddd.com" "FAX"", indicating that it has the facsimile communication function. Therefore, CPU 201 determines that IP terminal 102 has the facsimile communication function (step S403: YES) and stores in RAM 204 "FAX display ON" information as flag information associated with the above-noted NAPTR record, indicating that the facsimile function can be used (step S404).

When CPU 201 determines that IP terminal 102 has no facsimile communication function (step S403: NO) or after the above-noted flag information for the facsimile communication function is stored, the process proceeds to step S405.

Next, CPU 201 determines whether IP terminal 102 has an e-mail function corresponding to IP terminal 101 based upon the URI schemes of the obtained NAPTR record (step S405). In this case, the URI schemes of the NAPTR record shown in FIG. 3 include ""!^.*$!mailto:mail@jp.dddd.com" "e-mail"", indicating that it has the e-mail function. Therefore, CPU 201 determines that IP terminal 102 has the e-mail function (step S405: YES) and stores in RAM 204 "e-mail display ON" information as flag information associated with the above-noted NAPTR record, indicating that the e-mail function can be used (step S406).

Furthermore, when CPU 201 determines that IP terminal 102 has no e-mail function (step S405: NO) or after the above-noted flag information for the e-mail function is stored, the process proceeds to step S407.

Next, CPU 201 determines whether IP terminal 102 has an IP telephone function based upon the URI schemes of the obtained NAPTR record (step S407). In this case, the URI schemes of the NAPTR record shown in FIG. 3 include ""!^.*$!sip:info@sip.dddd.com" "Taro telephone"", indicating that it has the IP telephone function. Therefore, CPU 201 determines that IP terminal 102 has the IP telephone function (step S407: YES) and stores in RAM 204 "IP telephone display ON" information as flag information associated with the above-noted NAPTR record, indicating that the IP telephone function can be used (step S408).

When CPU 201 determines that IP terminal 102 has no IP telephone function (step S407: NO) or after the above-noted flag information for the IP phone function is stored, the process proceeds to step S409.

Figure 5:
FIG. 5 illustrates an example of communication functions that are displayed on the IP terminal according to the embodiment.

Next, CPU 201 displays, on display 206, the available communication functions based upon the flag information stored in RAM 204: "FAX display ON", "e-mail display ON" and "IP telephone display ON". A screen display example of the available functions is shown in FIG. 5. By referring to the displayed available communication functions, the IP terminal 101 user is able to learn the communication functions available to the destination IP terminal 102 that correspond to IP terminal 101.

The screen display example of FIG. 5 indicates a case wherein "05012345678", the telephone number of IP terminal 102, is displayed, meaning that an IP phone call can be made. In this case, the IP terminal 101 user becomes able to make an IP phone call to IP terminal 102 by pressing the start button (not shown in the figure) of key input section 203.

Next, after the IP terminal 101 user presses the start button of key input section 203, a call instruction signal is output to CPU 201 from key input section 203. When the call instruction signal is input from key input section 203, CPU 201 performs a transmission process as IP phone to IP terminal 102 based upon the IP phone control program stored in FROM 205 (step S410).

In this case, CPU 201 controls IP network controller 210 based upon the IP phone control program and performs, by referring to the NAPTR record obtained in step S402, a call connection process and a voice communication initiation process with IP terminal 102 based upon the SIP protocol, thereby enabling voice communication with IP terminal 102.

Figure 6:
FIG. 6 illustrates a screen display example to be shown on the IP terminal according to the embodiment, when the communication function to be performed is selected.

Next, when the IP terminal 101 user places a document on the document reader of reading section 207 (step S411), reading section 207 outputs, to CPU 201, a document placement signal. By the document placement signal output from reading section 207, CPU 201 sets the facsimile communication function as selected and displays "FAX" of display 206 as selected (step S412). FIG. 6 shows a display example of "FAX" as selected (in gray). In this case, "Press start button for transmission" is displayed as a message to the IP terminal 101 user.

After the IP terminal 101 user presses the start button of key input section 203 (step S413), key input section 203 outputs, to CPU 201, a readout start signal. After the readout start signal is input from key input section 203, CPU 201 starts scanning the document by outputting, to reading section 207, the readout start signal (step S414).

After the readout start signal is input from CPU 201, reading section 207 scans the document placed on the document reader, and converts the image of the document into digital image data to be output to CPU 201. CPU 201 reserves, in RAM 204, the digital image data input from reading section 207 and then obtains, from the NAPTR record obtained in step S402, fax transmission information for IP terminal 102 (step S415).

Next, CPU 201 controls IP network controller 210 based upon the facsimile communication control program stored in FROM 205 and performs a process for transmitting, to IP terminal 102, the digital image data reserved in RAM 204 (step S416), thereby terminating the process.

As described above, the IP terminal in the IP telephone system according to the present embodiment obtains, from the ENUM server, the NAPTR record of the destination IP terminal when transmitting a call to another IP terminal, and determines whether the destination IP terminal has the communication functions corresponding to the source IP terminal based upon the URI schemes specified in the NAPTR record. The source IP terminal then displays, on its display, one or a plurality of communication functions that are determined to be stored in the destination IP terminal and performs an operation in accordance with the displayed communication function, after which the source IP terminal starts a communication control with the destination IP terminal apparatus based upon the communication control program stored in FROM that corresponds to the communication function.

Therefore, when both source and destination IP terminals have a plurality of communication functions such as IP telephone, facsimile and e-mail functions, the source IP terminal user is able to reliably select the communication functions of the destination IP terminal that correspond to the source IP terminal, by referring to the communication functions displayed on the display.

As a result, the source IP terminal user is able to save the trouble of checking the communication functions of the destination IP terminal, thereby preventing a situation where a wrong communication function is selected.

In addition, the IP terminal of the IP telephone system according to the present embodiment stores in RAM flag information indicating that the communication functions available to the source IP terminal are stored in the destination IP terminal and displays, on its display, one or a plurality of communication functions that are stored in the destination IP terminal based upon the flag information.

Therefore, the source IP terminal is able to easily display the communication functions stored in both source and destination IP terminals, thereby reducing the amount of work for a display control.

Furthermore, the IP terminal of the IP telephone system according to the present embodiment is configured to be able to set the facsimile communication function as selected and start the facsimile transmission by pressing a transmission button after executing a transmission process as IP phone and placing a document on the reading section.

Therefore, the source IP terminal user is able to easily switch from the IP phone call transmission (the first communication function) to the facsimile communication (the second communication function), thereby reducing the amount of work for switching from the IP phone call to the facsimile communication.

In addition, the IP terminal according to the present embodiment stores in RAM the NAPTR record obtained from the ENUM server and flag information indicating the communication functions that are determined, based upon the NAPTR record, to be stored in the destination IP terminal. However, it is further possible to delete this NAPTR record and the flag information after a communication process is complete with the destination IP terminal. This enables effective use of the RAM memory area without the NAPTR record and flag information occupying much space.

When the NAPTR record and flag information stored in RAM are saved in another nonvolatile memory, it is possible to promptly display the communication functions based upon the saved flag information when redialing the same destination IP terminal. This makes it possible to skip a process for obtaining the NAPTR record from the ENUM server.

In the present embodiment, a case is provided wherein the IP phone, facsimile and e-mail communications are stored in IP terminals as IP terminal communication functions. However, it is not limited to these communications and it is further possible to store other communication functions for the present invention.

In the present embodiment, a case is provided wherein the function is switched from the IP phone communication to the facsimile communication. However, it is further possible, for example, to switch from the IP phone communication to the e-mail communication and the function to be switched to is not particularly limited.

In the present embodiment, a case is provided wherein IP terminal 101 places a call to IP terminal 102. However, it is further possible to have IP terminal 102 place a call to IP terminal 101.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based upon the Japanese Patent Application No. 2004-292865 filed on Oct. 5, 2004, entire content of which is expressly incorporated by reference herein.

What is claimed is:

1. An IP (Internet Protocol) terminal apparatus connected to an ENUM (Telephone Number Mapping) server via an IP network, the ENUM server storing NAPTR (Naming Authority Pointer) records associated with a telephone number, a NAPTR record including at least one communication function, the IP terminal apparatus comprising:

a first memory configured to store a plurality of communication control programs corresponding to a plurality of communication functions;

an inputter configured to input a telephone number of a destination IP terminal apparatus;

an obtainer configured to obtain the NAPTR records as terminal information regarding the destination IP terminal apparatus from the ENUM server, based on the input telephone number of the destination IP terminal apparatus;

a second memory configured to store NAPTR records of the destination IP terminal apparatus obtained by the obtainer;

an identifier configured to individually determine whether one of the communication functions specified in the NAPTR record stored in the second memory corresponds to the communication functions of the IP terminal apparatus, and configured to store in the second memory availability information in association with the NAPTR record specifying the corresponding communication function when there is at least one corresponding communication functions;

a display configured to display the communication functions specified in the NAPTR record in association with the availability information stored in the second memory by the identifier; and a communication controller configured to control communication with the destination IP terminal apparatus, based upon the communication control program corresponding to the at least one communication function, when an operation is performed in accordance with the at least one communication function displayed on said display.

2. The IP terminal apparatus according to claim 1, wherein, when an operation is performed in accordance with a first communication function among the plurality of communication functions displayed on said display, said communication controller controls a first communication with the destination IP terminal apparatus, based upon the communication control program corresponding to the first communication function, and wherein, when an operation is further performed in accordance with a second communication function among the plurality of communication functions, said communication controller controls a second communication with the destination IP terminal apparatus, based upon the communication control program corresponding to the second communication function.

3. The IP terminal apparatus according to claim 1, wherein, after the communication function displayed on said display is performed, said identifier deletes the NAPTR record and availability information stored in said second memory.

* * * * *